United States Patent [19]

Girardin

[11] Patent Number: 4,698,478

[45] Date of Patent: Oct. 6, 1987

[54] METHOD AND APPARATUS FOR RETHREADING THE ELECTRODE WIRE OF A TRAVELLING WIRE EDM APPARATUS THROUGH THE CUT IN A WORKPIECE

[75] Inventor: Roger Girardin, Vernier, Switzerland

[73] Assignee: Charmilles Technologies S.A., Geneva, Switzerland

[21] Appl. No.: 862,768

[22] Filed: May 13, 1986

[30] Foreign Application Priority Data

May 13, 1985 [CH] Switzerland .................. 2031/85

[51] Int. Cl.⁴ ........................................... B23H 7/02
[52] U.S. Cl. ............................................. 219/69 W
[58] Field of Search ................ 219/69 W, 69 M; 204/206, 224 M

[56] References Cited

U.S. PATENT DOCUMENTS

| | | | |
|---|---|---|---|
| 3,987,270 | 10/1976 | Ullmann et al. | 219/69 W |
| 4,242,558 | 12/1980 | Kunze | 219/69 W |
| 4,350,864 | 9/1982 | Janicke et al. | 219/69 W |
| 4,367,302 | 1/1983 | Girardin | 219/69 W |
| 4,465,915 | 8/1984 | Corcelle | 219/69 W |
| 4,547,647 | 10/1985 | Schneider | 219/69 W |

FOREIGN PATENT DOCUMENTS 141490  11/1979  Japan ..................... 219/69 W

*Primary Examiner*—A. D. Pellinen
*Assistant Examiner*—Geoffrey S. Evans
*Attorney, Agent, or Firm*—Gifford, Groh, VanOphem, Sheridan, Sprinkle and Dolgorukov

[57] ABSTRACT

The rethreading mechanism of a travelling wire EDM apparatus has a scrap wire disposal mechanism for disposing of the unusable length of electrode wire, or scrap, remaining in the machining zone after accidental rupture of the wire. The wire scrap disposal mechanism takes the form of a shaft having a bifurcated end defining tines between which the wire passes. Upon accidental rupture of the wire, the bifurcated shaft is automatically set in rotation such as to wind the length of wire between the shaft bifurcated end and the point of rupture of the wire in a bundle around the bifurcated end, and simultaneously exert a pull on a length of unused wire, which is also caused to wind around the shaft bifurcated end, such as to straighten the wire upstream of the bifurcated shaft. After cutting off the wire, the bundle of scrap wire around the bifurcated shaft is pushed off such as to fall in a disposal chute.

22 Claims, 3 Drawing Figures

METHOD AND APPARATUS FOR RETHREADING THE ELECTRODE WIRE OF A TRAVELLING WIRE EDM APPARATUS THROUGH THE CUT IN A WORKPIECE

BACKGROUND OF THE INVENTION

Prior to cutting a workpiece by means of an electrode wire, in a travelling wire EDM apparatus, it is necessary to thread the wire through a starting hole drilled in the workpiece. Threading of an electrode wire through a workpiece has been accomplished by diverse methods consisting generally in straightening the wire by exerting a pull on the wire, cutting the wire upstream of the workpiece, and feeding the cut end of the wire through the starting hole until the end of the wire is grabbed by the wire conveyor system.

However, in order to achieve a high machining speed and accuracy of the cut, the wire is subjected, during any cutting operations, to extreme thermal and mechanical stresses that can cause an accidental rupture of the wire in the middle of a cut. Such a rupture of the wire results in a prolonged work stoppage, more particularly if it occurs while the EDM apparatus is left unattended, for example, during the night. In order to avoid the economic waste caused by such work stoppages, it is necessary to provide for automatic re-threading of the wire immediately after its rupture. This operation is rather difficult to achieve due to the fact that the rupture of the wire has caused the wire to be out of shape and due to the fact that it is necessary to eliminate the unusable portion, or scrap portion, of the wire by cutting it off and evacuating the cut-off length of useless scrap wire. Until now there has been no practical solution proposed for disposal of the cut-off portion of the wire prior to starting the re-threading operation of the wire after an accidental rupture of the wire.

SUMMARY OF THE INVENTION

The principal object of the invention is to remedy the lack of practical solutions concerning the disposal of the cut-off scrap portion of an electrode wire after rupture of the wire during a cutting operation by an electrode wire in a travelling wire EDM apparatus.

The many objects and advantages of the present invention will become readily apparent to those skilled in the art when the following description of the best mode contemplated at the present for accomplishing the objects of the invention is read in conjunction with the accompanying drawing wherein:

DETAILED DESCRIPTION OF THE PREFERRED EMBODIMENT

Figure 1:
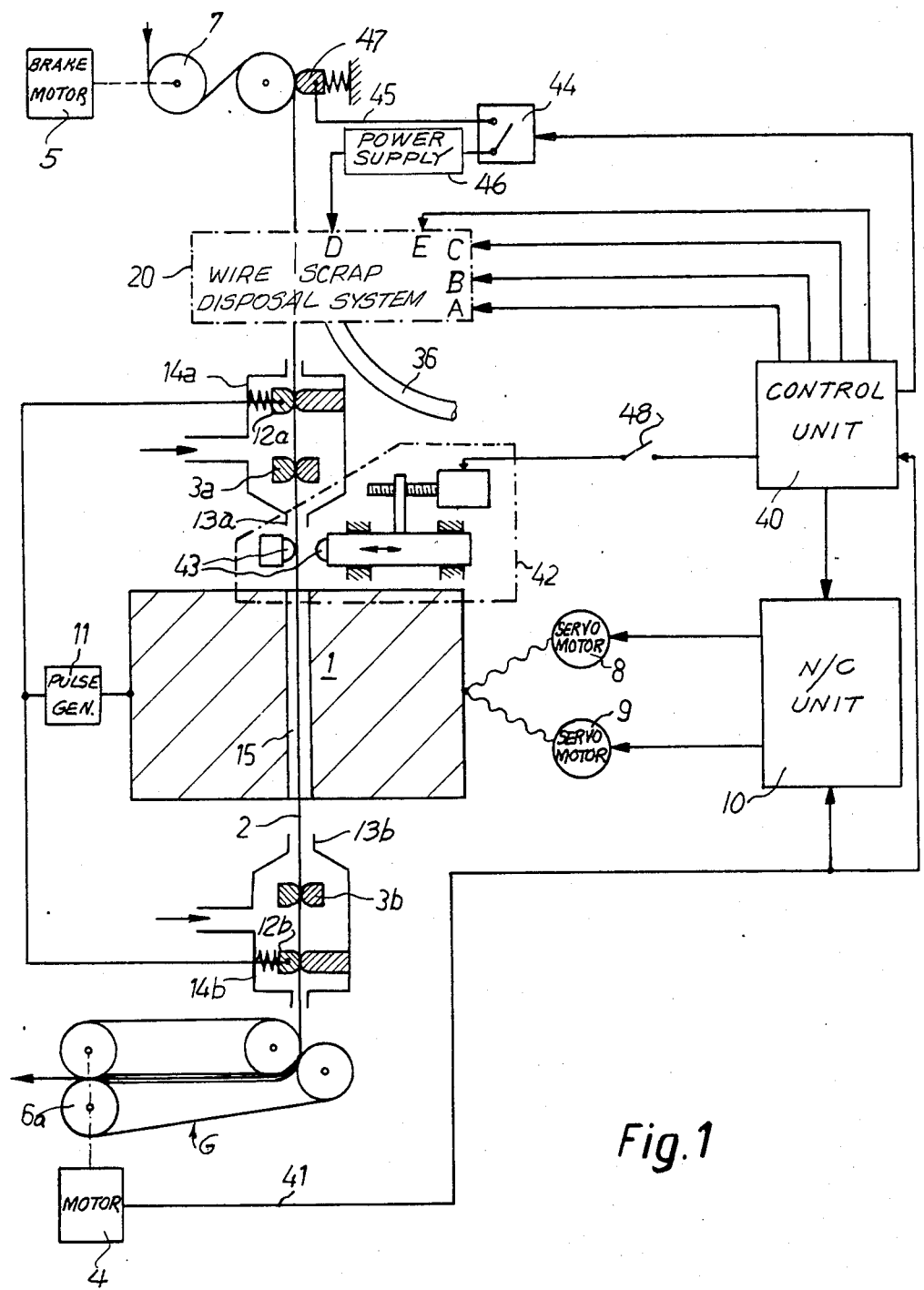
FIG. 1 is a schematic illustration of a travelling wire EDM apparatus incorporating an arrangement of structure according to the present invention.

As schematically illustrated in FIG. 1, a travelling wire EDM apparatus is shown which is arranged for cutting a workpiece 1 by means of an electrode wire 2 stretched between an upper guide member 3a and a lower guide member 3b. As is well known in the art, the electrode wire 2 is displaced longitudinally by being pulled by an appropriate feeding mechanism disposed below the workpiece 1 such as, for example, an endless belt conveyor system 6 whose driving rollers 6a are driven by an electric motor 4, while pull is being exerted on the wire 2 by a braking motor 5 coupled to a brake pulley or roller 7, disposed above the workpiece 1, and maintaining on the wire 2 a predetermined pull or tension. A pair of servo motors 8 and 9, controlled by a numerical control unit 10, displace the workpiece 1 relative to the wire 2 by means of a cross-slide table not shown, such as to cut the workpiece according to a programmed cutting path. A pulse generator 11, for the purpose of supplying electrical discharges in a machining zone between the wire 2 and the workpiece 1, is electrically connected across the workpiece 1 and the electrode wire 2, one terminal of the pulse generator 11 being connected to the electrode wire 2 by means of a contact 12a engaging the electrode wire 2 above the workpiece upper and by means of another contact 12b engaged with the electrode wire 2 below the workpiece 1. A machining fluid injection head 14a, preferably surrounding the wire upper guide member 3a and electric contact 12a, is disposed above the workpiece 1, while a second fluid injection head 14b, surrounding the lower wire guide member 3b and contact 12b, is disposed below the workpiece. The fluid injection heads 14a and 14b are each supplied with machining fluid, as indicated by the arrows and are each adapted to inject machining fluid into the machining zone by means of the nozzles 13a and 13b directed towards the cut 15 effected in the workpiece 1 by the electrical discharges occuring in the machining zone between the electrode wire 2 and the machined surface of the workpiece 1.

A wire scrap disposal mechanism 20 is installed above the upper fluid injection head 14a. As shown in detail in FIG. 2, the wire scrap disposal mechanism 20 comprises a bifurcated shaft 21 rotatably disposed in a tubular member 22 provided with a longitudinal slot 23 open at the free end of the tubular member 22. The shaft 21 is drivable in rotation by an electric motor 25. The tubular member 22, and the motor 25 mounted on the end of the tubular member 22, are capable of longitudinal displacement by means of a jackscrew 24 driven by a second electric motor 26, the tubular member 22 being disposed longitudinally slidable in a bore 30 in a stationary housing 31. A slidable sleeve 27 is disposed between the inner surfac of the tubular member 22 and the peripheral surface of the shaft 21. A spring 28 urges the sleeve 27 towards the closed end of the tubular member 22, i.e. towards the right as seen in the drawing. The free end of the shaft 21 is bifurcated as a result of having a longitudinal slot 29 open to the end of the shaft 21 and forming a pair of substantially parallel tines between which the wire 2 travels. The slot 29 is normally generally aligned with the slot 23 in the end of the tubular member 22, such that the electrode wire 2 passes through both slots 23 and 29. A conduit 32 supplies pressurized fluid to an annular chamber 32a formed by a groove in the peripheral surface of the sleeve 27 at the closed end of the tubular member 22, the flow of fluid through the conduit 32 being controlled by a valve 33. A seal 34, for example an elastomeric O-ring, disposed in an appropriate groove in the periphery of the sleeve 27, prevents leakage of fluid from the annular chamber 32a past the sleeve 27. An electrically controlled wire guillotine or wire cutter 35 is disposed above the slotted bifurcated ends of the tubular member 22 and shaft 21, the wire 2 also passing, without physical contact therewith, through the wire cutter 35.

Figure 2:
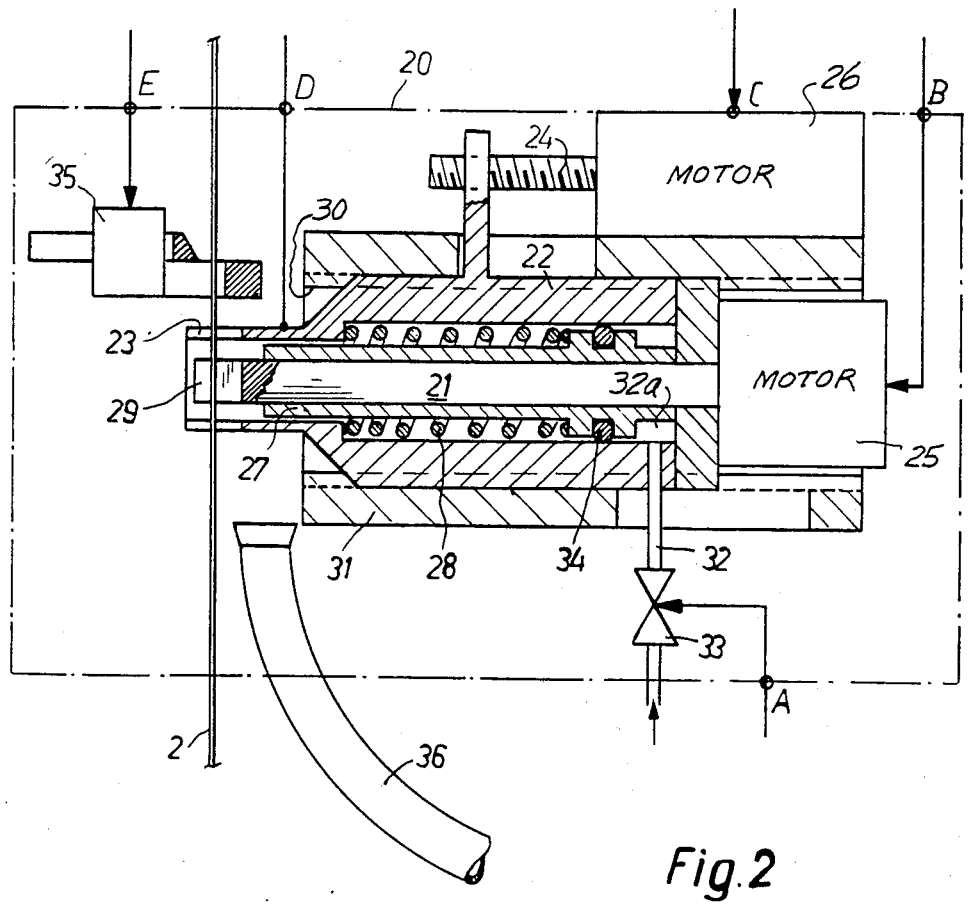
FIGS. 2 and 3 illustrate alternate structures for evacuating a length of scrap wire.

The operation of the combination of elements of FIG. 2 is as follows:

As long as machining proceeds normally, the axial slots 23 and 29 of the tubular member 22 and shaft 21 remain aligned with the wire 2, which passes through the slots 22 and 29 without touching their edges. Accidental rupture of the wire always occurs in the machining zone, i.e. below the wire scrap disposal unit 20. When breakage of the wire 2 is detected, through sudden acceleration, of the conveyor motor 4, decrease of the required torque of the conveyor motor 4, or sudden momentary drop of the braking force exerted by the motor 5, the motor 25 is automatically started, via terminal B, and rotates the shaft 21, thus causing the wire passed between the tines formed by the slot 29 to be wound around the slotted bifurcated end of the shaft 21. This causes a pull to be exerted on the wire 2 above the wire scrap disposal unit 20. The pull exerted on the wire 2 straightens the wire 2, and can be effected either at room temperature, the straightened wire 2 being then relatively stiff as a result of having been cold hardened by traction and elongation, or while heating the wire 2. Depending on its composition, the wire 2 can also be heat-hardened or heat-annealed preferably by passing electrical current through the wire 2 via terminal D connected to the tubular member 22.

The guillotine or wire cutter 35 is activated, via terminal E, for cutting the wire 2 in order to separate it from its scrap end portion. The scrap portion of the wire 2 is the length of wire 2 ending at the break which, as a result of the stress imposed on it, of its heating and of its electrical errosion in the machining zone, has become completely useless and must be disposed of. When the shaft 21 is rotated, while the tubular member 22 remains stationary, the scrap end of the wire 2, guided by the slot 23 on the end of the tubular member 22, is caused to wind around the bifurcated end of the shaft 21 until the whole length of scrap wire is wound around the end of the shaft 21 within the tubular member 22.

The motor 26 is subsequently activated, via terminal C, for retracting the tubular member 22 and shaft 21 to the right, as seen in the drawing, such as to bring the bundle of scrap wire over the inlet of a disposal chute such as, for example, a tube 36. The valve 33 is energized to be open, via terminal A, and fluid under pressure introduced into the annular chamber 32a, via the conduit 32, displaces the sleeve 27 to the left, as seen in the drawing. The end of the sleeve 27 pushes the wound length of scrap wire beyond the slotted end of the shaft 21, and the small bundle of scrap wire falls into the disposal conduit 36 by gravity, or by way of suction exerted by the conduit 36. The fresh and intact portion of the wire 2, upstream of the wire cutter 35, may now be pushed, by any mechanism well known in the art, towards the upper wire guide member 3a, FIG. 1. This can be accomplished not only when the tubular member 22 and shaft 21 are still retracted, but also after the tubular member and the shaft have been returned to the position shown at FIG. 2, as long as the slot 29 at the end of the shaft 21 has been re-oriented vertically such as to allow passage of the wire 2 through the slot. It may be advantageous to provide the slot 29 or the slot 23, or both, with a V-shape for example, which, when the tubular member 22 and the shaft 21 are displaced to the left beyond their home position, aids in guiding the end of the wire 2 towards the guide member 3a. A further modification consists in maintaining the sleeve 27 stationary in the bore 30 of the housing 31, and to dimension the sleeve 27 lengthwise such that its end pushes the scrap wire wound around the end of the shaft 21 when the shaft 21 is retracted to the right. Such a modification permits omission of the hydraulic control of the sleeve 27, but is not quite as versatile.

Figure 3:
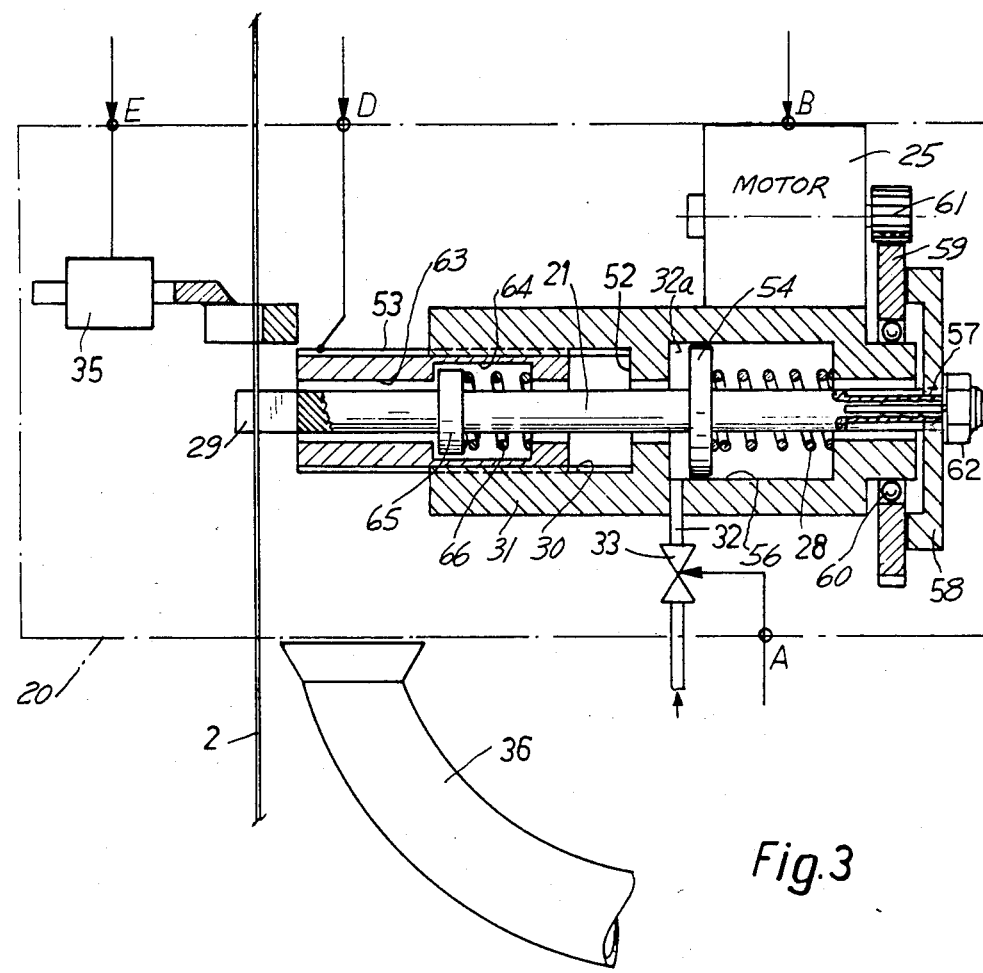

The consecutive steps for eliminating the length of scrap wire are controlled and synchronized by a control unit 40, FIG. 1. When the wire 2 breaks, the torque exerted by the motor 4 decreases, and an appropriate signal provided by the motor 4, or by an appropriate monitoring circuit, is supplied by a line 41 to the N/C unit 10 which normally determines the coordinates of the cutting path in the workpiece 1, simultaneously with applying the signal to the control unit 40. The latter initiates a sequence of steps preliminary to the rethreading of the wire 2 and which comprises more particularly the wire cut-off and scrap evacuation steps described hereinabove, and also the pulling or stretching step for straightening the wire, by applying appropriately timed control signals to the wire scrap disposal unit 20 via its terminals A, B, C and E which, as illustrated at FIGS. 2 and 3, are connected respectively to the fluid flow valve 33, the drive motor 25 for the shaft 21, the drive motor 26 for the jackscrew 24 reciprocating the tubular member 22 and the operating element, for example in the form of a solenoid, of the wire cutter 35. A relay switch 44, also controlled by the control unit 40, permits to the straightening of the wire 2 by heating the wire 2, if so desired. Heating of the wire 2 is effected by connecting an electrical power supply 46, when the switch of the relay switch 44 is closed, across a contact 47 engaged with the wire 2, via a line 45, and the terminal D of the wire scrap disposal unit 20, the terminal D being connected, as shown at FIG. 2, to the tubular member 22, and which causes the current supplied by the power supply 46 to flow through the wire 2 in its length between the contact 47 and the shaft 21, while the scrap portion of the wire is wound around the slotted end of the shaft 21, thus causing contact of the wire with the edge of the slot 23 on the end of the tubular member 22. If it is not desired to heat the wire 2 to straighten it, for example when the wire 2 contains a large proportion of copper, with the attending result of causing cold hardening of the wire 2 while being subjected to a pull, the switch of the relay switch 44 is left open. In order to facilitate the wire rethreading operation itself, an appropriate wire guiding unit 42, FIG. 1, may be provided, which comprises appropriate retractable wire guide units 43, as is well known in the art, the operation of the wire guiding unit 42 being effected under the control of the control unit 40 when a switch 48 is closed.

FIG. 3 illustrates a modification of the wire scrap disposal unit 20, wherein elements similar to those of FIG. 2 are designated by like reference numerals. In the embodiment of FIG. 3, the bifurcated slotted shaft 21 is surrounded by a non-slotted tubular member 53 slidably disposed in the bore 30 in the housing 31, the bore 30 being closed at an end portion of the shaft 21. The projecting end portion of the shaft 21 is provided with a shoulder portion defining a piston 54 in a bore 56 aligned with the bore 30. A coil spring 28, surrounding the end portion of the shaft 21 in the bore 56 between the end of the bore 56 and the piston 54, urges the shaft 21 to the position indicated at FIG. 3. The extreme end portion of the shaft 21 projecting beyond the housing 31 is connected, for example by means of a sliding spline and groove arrangement 57, to a coupling cup member 58 welded or otherwise fastened to a gearwheel 59 rotatably supported around the housing 51 by a bearing, such as ball bearing 60. A pinion 61 mounted on the driveshaft of the motor 25 meshes with the gear wheel 59 such that when the motor 25 is activated, the shaft 21 is driven in rotation, thus winding the length of scrap wire, the end of which is trapped in the slot 29, around the bifurcated end of the shaft 21 projecting beyond the tubular member 53. Appropriate thrust bearing members, not shown, are provided for cooperating with the gear wheel 59 such as to prevent displacement of the gear wheel 59 and of the coupling disk 58 to the right when fluid under pressure, as controlled by the valve 33, is introduced into the annular chamber 32a beyond the piston 54 in the bore 56. Introduction of pressurized fluid in the annular chamber 32a displaces the piston 54, and consequently the shaft 21, to the right as seen in the drawing and, when hydraulic fluid is removed from the annular chamber 32a, the piston 54 and the shaft 21 are returned to the position of FIG. 3 under the action of the return spring 28, a nut 62, threading on the threaded end of the shaft 21 projecting beyond the coupling disk 58, limiting the displacement of the shaft 21 to the left.

The tubular member 53 has its end projecting beyond the housing 31 provided with a bore 63 of a diameter fitting, with appropriate clearance, over the shaft 21. The other end of the tubular member 53 has a bore 64 of larger diameter accomodating a shoulder 65 formed on the periphery of the shaft 21 and a coil spring 66 disposed around the shaft 21 between the shoulder portion 65 and the end of the bore 64.

After a bundle of scrap wire has been wound around the bifurated slotted end of the shaft 21, and the bundle of wire is separated from the unused wire 2 by being cut-off therefrom by the wire cutter 35, pressurized fluid is introduced into the annular chamber 32a, thus displacing the shaft 21 to the right, and simultaneously displacing the tubular member 53 in the same direction due to the connection between the shaft 2 and the tubular member 33 effected by the coil spring 66, until the end of the tubular member 53 in the housing bore 30 is caused to abut against the bore end wall 52, thus limiting the displacement of the tubular member 53 to a position substantially aligned with the inlet of the wire scrap chute defined by the conduit 36. Continued introduction of pressurized fluid via the valve 33 and the conduit 32 into the annular chamber 32a causes further displacement of the shaft 21, further compressing both springs 28 and 66, until the slotted end of the shaft 21 is fully retracted within the smaller diameter bore 63 of the tubular member 53, thus causing the bundle of scrap wire to fall through the inlet of the conduit 36.

Having thus described the present invention by way of specific example of structure, given for illustrative purpose only, which are well designed to accomplish the objects of the invention, what is claimed as new is as follows.

I claim:

1. In a method for rethreading the wire electrode of a travelling wire EDM apparatus through a cut effected by said wire electrode in a workpiece in the course of cutting said workpiece by electrical discharge occuring in a machining zone between said workpiece and said electrode wire, said electrode wire having been accidentally ruptured in the course of said cutting, said method comprising the steps of straightening said wire by effecting a pull on said wire, cutting off said wire and threading said wire through the cut in the workpiece, the improvement comprising the steps of passing the wire upstream of said machining zone through the bifurcated end of a rotatable shaft, rotating the shaft after rupture of the wire such as to wind around the shaft bifurcated end the end portion of the wire between the shaft bifurcated end and the ruptured end of the wire and such as to apply on the portion of the wire between the shaft bifurcated end and a wire braking means a pull sufficient to straighten the wire, cutting off the wire at a portion thereof which has been straightened, disposing of the length of wire wound around the shaft bifurcated end by pushing the wound bundle of scrap wire from said bifurcated end, and threading the end of the straightened portion of the wire through the cut in the workpiece.

2. The method of claim 1 wherein disposal of the bundle of scrap wire is effected by pushing the bundle of scrap wire from the shaft bifurcated end and dropping the bundle of scrap wire in a disposal chute.

3. The method of claim 1 wherein a predetermined pull is exerted on the wire in order to straighten it.

4. The method of claim 2 wherein a predetermined pull is exerted on the wire in order to straighten it.

5. The method of claim 3 wherein the pull is exerted at room temperature.

6. The method of claim 4 wherein the pull is exerted at room temperature.

7. The method of claim 2 wherein the pull is exerted while heating the wire by flowing electrical current through the wire and through the shaft bifurcated end.

8. The method of claim 3 wherein the pull is exerted while heating the wire by flowing electrical current through the wire and through the shaft bifurcated end.

9. The method of claim 4 wherein the pull is exerted while heating the wire by flowing electrical current through the wire and through the shaft bifurcated end of said shaft.

10. The method of claim 1 wherein the wire is guided in a zone between the shaft bifurcated end and the workpiece during its introduction within the cut in the workpiece.

11. In a travelling wire EDM apparatus for effecting a cut in a workpiece by means of electrical discharges in a machining zone between the workpiece and an electrode wire, comprising wire transporting means for longitudinally pulling the wire through the machining zone, said wire transporting means being disposed on one side of the machining zone, wire braking means disposed on the other side of the machining zone for causing said wire transporting means to continuously exert a pull on the wire, and means for threading the end of the wire through the cut in the workpiece, the improvement comprising a rotatable shaft having a bifurcated end disposed between said wire braking means and said machining zone, means for placing the shaft bifurcated end on one side and the other of the wire, means for rotating said shaft upon rupture of said wire for winding around said shaft bifurcated end a bundle of the wire consisting of the length of wire between said bifurcated end and the ruptured end of the wire while simultaneously effecting a pull on the portion of the wire between the shaft bifurcated end and said braking means such as to straighten said portion of said wire, means for cutting off the wire, means for pushing said bundle of scrap wire from said shaft bifurcated end, and means for controlling the rotation of said shaft, the cutting off of said wire and the pushing off of said bundle of scrap wire according to a predetermined sequence.

12. The improvement of claim 11 wherein the longitudinal axis of said bifurcated shaft end is transverse to the longitudinal axis of the wire.

13. The improvement of claim 11 wherein said braking means and said rotatable bifurcated shaft cooperate to effectuate a pull on the wire causing stress hardening of the wire.

14. The improvement of claim 12 wherein said braking means and said rotatable bifurcated shaft cooperate to effectuate a pull on the wire causing stress hardening of the wire.

15. The improvement of claim 11 wherein said braking means and said rotatable shaft cooperate to effectuate a predetermined pull on said wire, and further comprising means for heating the wire between said braking means and said rotatable shaft.

16. The improvement of claim 12 wherein said braking means and said rotatable shaft cooperate to effectuate a predetermined pull on said wire, and further comprising means for heating the wire between said braking means and said rotatable shaft.

17. The improvement of claim 11 further comprising retractable wire guiding means disposed between the rotatable bifurcated shaft and the machining zone.

18. The improvement of claim 12 further comprising retractable wire guiding means disposed between the rotatable bifurcated shaft and the machining zone.

19. The improvement of claim 13 further comprising retractable wire guiding means disposed between the rotatable bifurcated shaft and the machining zone.

20. The improvement of claim 14 further comprising retractable wire guiding means disposed between the rotatable bifurcated shaft and the machining zone.

21. The improvement of claim 15 further comprising retractable wire guiding means disposed between the rotatable bifurcated shaft and the machining zone.

22. The improvement of claim 16 further comprising retractable wire guiding means disposed between the rotatable bifurcated shaft and the machining zone.

* * * * *

UNITED STATES PATENT AND TRADEMARK OFFICE
CERTIFICATE OF CORRECTION

PATENT NO.   :   4,698,478
DATED        :   October 6, 1987
INVENTOR(S)  :   Roger Girardin It is certified that error appears in the above-identified patent and that said Letters Patent is hereby corrected as shown below:

Col. 2, line 17, delete "upper" and insert --1--;

Col. 5, line 34, delete "bifurated" to --bifurcated--;

line 40, delete "2" and insert --21--;

ine 41, delete "33" and insert --53--.

Signed and Sealed this

Twenty-third Day of February, 1988

Attest:

DONALD J. QUIGG

Attesting Officer      Commissioner of Patents and Trademarks